United States Patent [19]

Vogel

[11] Patent Number: 5,963,965
[45] Date of Patent: Oct. 5, 1999

[54] TEXT PROCESSING AND RETRIEVAL SYSTEM AND METHOD

[75] Inventor: Claude Vogel, Alfortville, France

[73] Assignee: Semio Corporation, Los Angeles, Calif.

[21] Appl. No.: 08/801,970

[22] Filed: Feb. 18, 1997

[51] Int. Cl.⁶ ..................................................... G06F 17/21
[52] U.S. Cl. ............................................... 707/501; 707/3
[58] Field of Search ................................... 707/501, 514, 707/531, 3, 4, 5, 104; 704/1, 9

[56] References Cited

U.S. PATENT DOCUMENTS

| 5,265,065 | 11/1993 | Turtle | 707/4 |
| 5,325,298 | 6/1994 | Gallant | 704/9 |
| 5,517,783 | 5/1996 | Anderson et al. | 707/4 |
| 5,625,767 | 4/1997 | Bartell et al. | 345/440 |
| 5,694,594 | 12/1997 | Chang | 707/6 |
| 5,708,822 | 1/1998 | Wical | 704/1 |
| 5,708,825 | 1/1998 | Sotomayor | 707/501 |
| 5,768,580 | 6/1998 | Wical | 707/102 |

OTHER PUBLICATIONS

Neuss et al., "Conceptual Analysis of Resource meta–information", http://www.informatik.th–darmstadt.de/~neuss/www3/www3.html, Jul. 1998, pp. 1–14.

Quintana et al., "Graph–based retrieval of information in hypertext systems", SIGDOC'92, 1992 pp. 157–168.

Gauch et al., "The Scientist's Assistant: Structure–based navigation of technical texts", Proceedings of Second Annual Symposium on Document Analysis and Information Retrieval, Jan. 1993, pp. 367–377.

Salton et al., "Selective text utilization and text traversal", Hypertext '93 Proceedings, Nov. 1993, pp. 131–144.

Salton et al., "Automatic text decomposition and structuring", Information Processing & Management, vol. 32, No. 2, Feb. 1996, pp. 127–138.

Agosti et al., "On the use of information retrieval techniques for the automatic construction of hypertext", Information Processing & Management, vol. 33, No. 2, Mar. 1997, pp. 133–144.

Tan et al., "RADA–A research and development advisor incorporating artificial intelligence techniques and expert system approaches", Expert Systems with Applications, vol. 1, 1990, pp. 171–178.

Primary Examiner—Stephen S. Hong
Attorney, Agent, or Firm—Gray Cary Ware & Freidenrich

[57] ABSTRACT

A content-based system and method for text processing and retrieval is provided wherein a plurality of pieces of text are processed based on content to generate an index for each piece of text, the index comprising a list of phrases that represent the content of the piece of text. The phrases are grouped together to generate clusters based on a degree of relationship of the phrases, and a hierarchical structure is generated, the hierarchical structure comprising a plurality of maps, each map corresponding to a predetermined degree of relationship, the map graphically depicting the clusters at the predetermined degree of relationship, and comprising a plurality of nodes, each node representing a cluster, and a plurality of links connecting nodes that are related. The map is displayed to a user, a user selects a particular cluster on the map, and a portion of text is extracted from said pieces of text based on the cluster selected by the user. The system may also generate scenarios, based on said maps, that indicate changes in the relationships shown by the maps.

34 Claims, 13 Drawing Sheets

═══════ document 1 : Eudora. txt ═══════
──────── extrait 98 ────────

The Attachment Type portion of this menu allows you to select what format documents that you attach to outgoing messages are encoded in: AppleDouble, AppleSingle, or Bin Hex. AppleDouble is best for recipients with Multipurpose Internet Mail Extensions (MIME); AppleSingle is best for sending applications or other Macintosh-specific files; and Bin Hex is most compatible with old Macintosh mailers and previous versions of Eudora.

──────── extrait 459 ────────

This two-position option allows for the selection of what format documents you attach to outgoing messages are encoded in: AppleDouble or Bin Hex. AppleDouble is best for recipients with MIME; Bin Hex is most compatible with old Macintosh mailers and previous versions of Eudora.

FIGURE 18

TEXT PROCESSING AND RETRIEVAL SYSTEM AND METHOD

BACKGROUND OF THE INVENTION

This invention relates generally to a system and method for processing and retrieving text, and in particular to a system and method for processing large amounts of text and for generating visual displays of the text that may be rapidly searched by a user.

A dramatic increase in the storage capacity and decrease in the cost of computer hard drives, and increases in the transmission speed of computer communications and in the processing speed of computers and the expansion of computer communications networks, such as a bulletin board or the Internet, have all contributed to the extensive storage and retrieval of textual data information using computer databases. People also currently have access to the large amounts of textual data through these databases. Although the technology facilitates storage of and access to the textual data, there are new problems that have been created by the large amount of textual data that is now available.

In particular, a person trying to access textual data in a computer database having a large amount of data needs a system for analyzing the data in order to retrieve the desired information quickly and efficiently without retrieving extraneous information. Many typical text search and retrieval systems are "top down" systems where the user formulates a search request, but does not have access to the actual textual data so that the user must guess at the proper request to obtain the desired data. One conventional "top down" system for retrieving textual data is a keyword search system. In the keyword search system, a user develops a search request, known as a query, using one or more keywords, and then a search of the database is conducted using the keywords. If the user knows the exact keywords that will retrieve the desired data, then the keyword search may provide useful results. However, most users do not know the exact keyword or combination of keywords that will produce the desired data. In addition, even though a specifically focused keywords may retrieve the desired data, they may also retrieve a large amount of extraneous data that happens to contain the keyword(s). The user must then sift through all of the extraneous data to find the desired data which may be a time-consuming process. In addition, as the amount of data searchable in a computer database increases, the sifting process becomes even more time consuming.

These conventional keyword based data retrieval systems also have another problem related to the inherent properties of the human language. In particular, a keyword selected by the user may not match the words within the text or may retrieve extraneous information for a couple of reasons. First, different people will likely choose different keywords to describe the same object because the choice of keywords depends on the person's needs, knowledge or language. For example, one person may call a particular object a "bank" while another person may call the same object a "savings and loan". Therefore, a keyword search for "bank" would not retrieve an article by a more sophisticated user about a savings and loan even though the article may be a relevant piece of data. Second, the same word may have more than one distinct meaning. In particular, the same word used in different contexts or when used by different people may have a different meaning. For example, the keyword "bank" may retrieve text about a river bank or a savings bank when only articles about a savings bank are desirable. Therefore, a piece of text that contains all of the relevant keywords may still be completely irrelevant.

The keyword-based text analysis and retrieval system, as described above, is a top-down text retrieval system. In a top-down text retrieval system, it is assumed that the user doing the keyword search knows the information that he is looking for, and this permits the user to query the database in order to locate the desired information. However, in a top-down system, the user does not have access to the actual textual data and cannot sample the words within the text to make selections of the appropriate keywords to retrieve the desired textual data. Other top-down text retrieval systems attempt to correct some of the deficiencies of the keyword text retrieval system by doing phrase-based searches. While these may be less likely to retrieve totally irrelevant pieces of text, they also may have a higher probability of missing the desired text because the exact phrase may not be present in the desired text.

All of these text retrieval systems are top-down text retrieval systems in which keywords are used to retrieve pieces of textual data and there is no attempt to generate a content-based index of the textual data. None of these systems uses a bottom-up approach in which the user views a structured version of the actual textual data. The structured version of the textual data may have words and phrases extracted from the textual data that provide some indication of the content and/or the context of the textual data so that a user may have a content and context-based view of the textual data available and perform a search of the textual data based on the content-based phrases or words. The structured content-based phrases permits a user to easily navigate through a large amount of data because the content-based phrases provide a easy way to quickly review a large number of phrases.

Thus, there is a need for an improved text retrieval system and method which avoid these and other problems of known systems and methods, and it is to this end that the present invention is directed.

SUMMARY OF THE INVENTION

The invention provides a text analysis and retrieval system that uses a bottom-up approach in which all of the text is processed, using a efficient mapping process, to provide the user with a graphical content-based roadmap of the text so that the user may view phrases of the actual textual data in order to determine the desired data. The system may also scan the content-based maps to generate information about changes in the textual data. In particular, during the mapping process, the invention extracts words or phrases from the textual data that may be clustered together as word clusters, and those word clusters may be combined together to form the content-based graphical maps. The maps, which are displayed graphically, permit the user, without a keyword search, to navigate through the actual textual data quickly and locate the relevant information. The scanning process may semiotically process a plurality of maps and clusters of words over time to produce scenarios that indicate changes in the maps and clusters. With this bottom-up approach, a user does not need to guess at the keywords used within the textual data because the user is viewing the actual words and phrases in the textual data.

To generate the content-based roadmap, each piece of textual data may be parsed and words or phrases within the textual data may be extracted. In most typical informational textual data, the content of the textual data may be most easily determined by reviewing groups of more than one word (i.e., the phrases) contained within the textual data. A phrase may be two words or as many as six words. These phrases provide the most information about the content of a piece of textual data and permit a user to determine whether the piece of textual data is relevant. The invention takes advantage of phrases in processing each piece of textual data in order to condense each piece of textual data without losing any content.

The invention also provides a system and method which may display an overview map to the user which permits the user to select links to other maps that contain more specific textual data information. Thus, the system is scaleable in that different maps may be generated where each map may have a different degree of specificity and may be used to represent different subsets of the textual data. A user may then search for textual data at multiple different degrees of specificity depending on the desired data. The system may also permit the user to display extracts of the textual data that have the word clusters selected by the user so that the user can quickly determine whether the piece of textual data is relevant.

In accordance with the invention, a system and method for processing and retrieving textual data is provided wherein a plurality of pieces of text are processed based on content to generate an index for each piece of text, the index comprising a list of phrases that represent the content of the piece of text. The phrases are grouped together to generate clusters based on a degree of relationship of the phrases, and a hierarchical structure is generated, the hierarchical structure comprising a plurality of maps, each map corresponding to a predetermined degree of relationship, the map graphically depicting the clusters at the predetermined degree of relationship, and comprising a plurality of nodes, each node representing a cluster, and a plurality of links connecting nodes that are related. The map is displayed to a user, a user selects a particular cluster on the map, and a portion of text is extracted from said pieces of text based on the cluster selected by the user.

In accordance with the invention, a content-based text processing and retrieval system and method are provided comprising processing a plurality of pieces of text based on content to generate an index for each piece of text, the index comprising a list of phrases that represent the content of the piece of text, grouping phrases together to generate clusters based on a predetermined degree of relationship between the phrases, and generating a hierarchical structure, the hierarchical structure comprising a plurality of maps, each map corresponding to a predetermined degree of relationship, the map graphically depicting the clusters at the predetermined degree of relationship and comprising a plurality of nodes, each node representing a cluster, and a plurality of links connecting nodes that are related. A semiotic data structure may be generated from said plurality of pieces of text, the semiotic data structure comprising a list of phrases that indicate the content of said pieces of text, and a tag that is associated with each phrase in said semiotic data structure to classify which word by its content, and a plurality of maps may be compared to each other based on the semiotic data structure to generate a scenario, said scenario indicating changes in the relationship graphically depicted by said maps.

BRIEF DESCRIPTION OF THE DRAWINGS

FIG. 18 is a diagram showing the text abstracts extracted from the sample piece of textual data based on the user selection shown in FIG. 17.

DETAILED DESCRIPTION OF A PREFERRED EMBODIMENT

The invention is particularly applicable to a system for processing and retrieving textual data in a client-server network environment. It is in this context that the invention will be described. It will be appreciated, however, that the system and method in accordance with the invention has greater utility.

Figure 1:
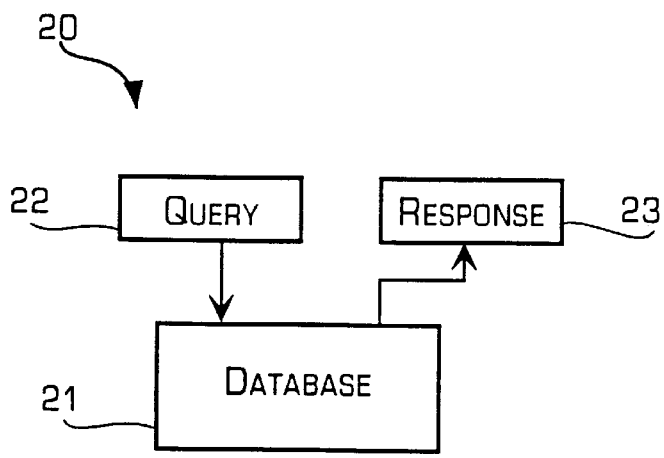
FIG. 1 is a diagrammatic view of a conventional top-down text retrieval system.

FIG. 1 is a diagrammatic view of a conventional top-down text retrieval system 30. The top-down system may have a text database 32 that contains a plurality of pieces of textual data. A user attempting to retrieve data from the text database must think about the desired information and guess at the query that might help obtain that information from the database. In particular, the user may generate a keyword query 36 comprising one or more keywords, possibly connected by logical operators, that may be simply a "best" guess of a query that characterizes the desired information. The keyword query is then sent to the database, and based on the query, the database returns a response 38 that contains textual data containing the keywords, including relevant textual data as well as irrelevant textual data. Since the system does not permit the user to preview the actual text data within the database prior to generating the keyword query, the success rate of the search may be low. In addition, the textual data returned by the database may include many irrelevant pieces of textual data, known as documents, that must be filtered through by the user. The system is therefore very inefficient and time consuming. A bottom-up text processing and retrieval system in accordance with the invention which avoids these difficulties now will be described.

Figure 2:
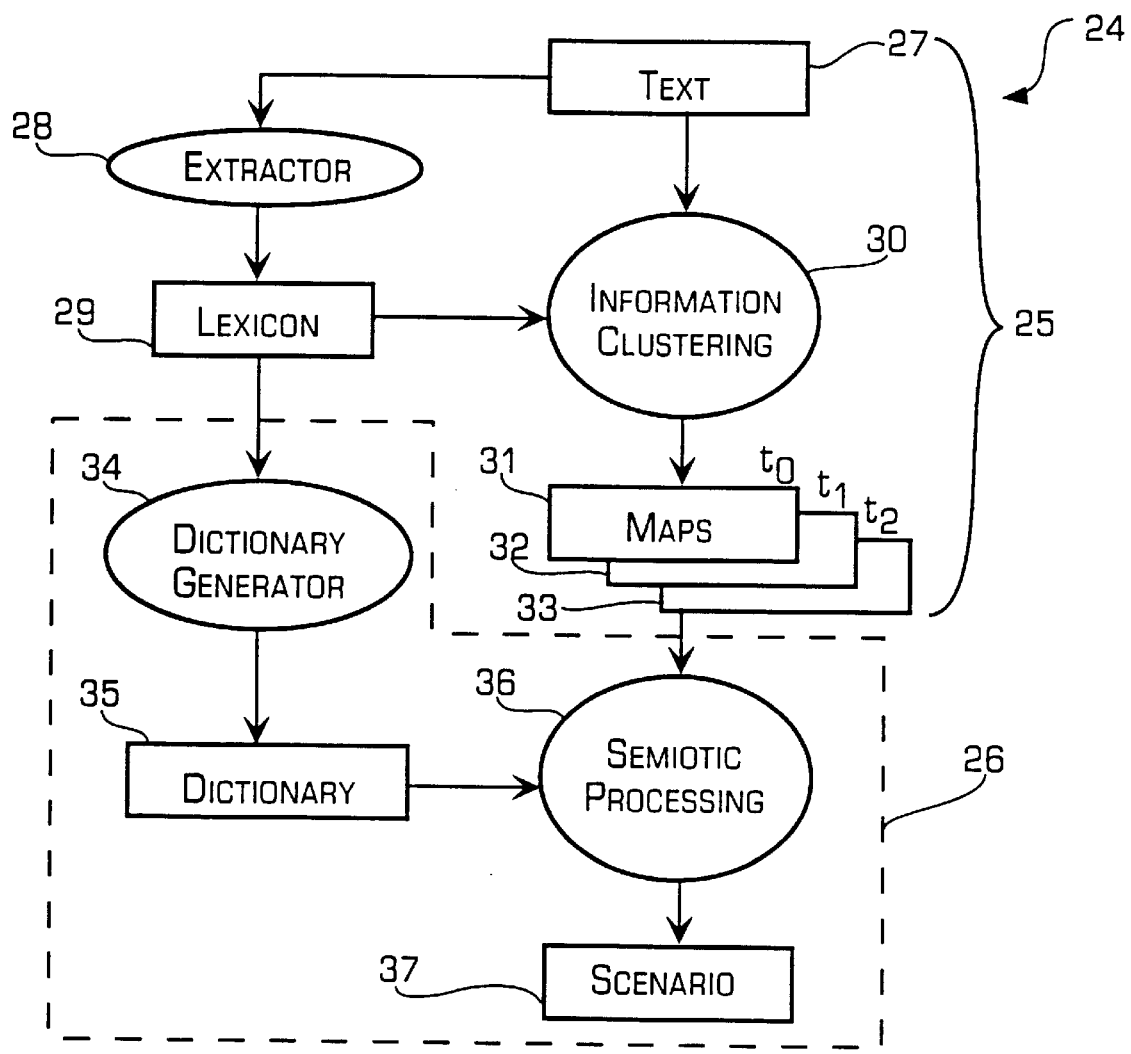
FIG. 2 is a diagrammatic view of an overall bottom-up context and content-based text processing and retrieval system in accordance with the invention.

FIG. 2 is a diagrammatic overview of a bottom-up context and content-based text processing and retrieval system 24 in accordance with the invention. The system may have a mapping sub-system 25 that is described with reference to FIGS. 3 and 6A and a scanning sub-system 26 that is described with reference to FIG. 6B. The mapping system may permit a user of the system to view a structured version of the actual text in order to retrieve pieces of text. The scanning sub-system may utilize the structured version of the actual text generated by the mapping portion, known as a map, and "scan" a plurality of maps at different times to generate a "story" of changes that occur within the maps. For example, if the people mentioned in connection with a corporation's board of directors changes, the scanning portion may highlight that change. A user of the system may utilize the mapping portion or the scanning portion separately or as a combined system.

Figure 15:
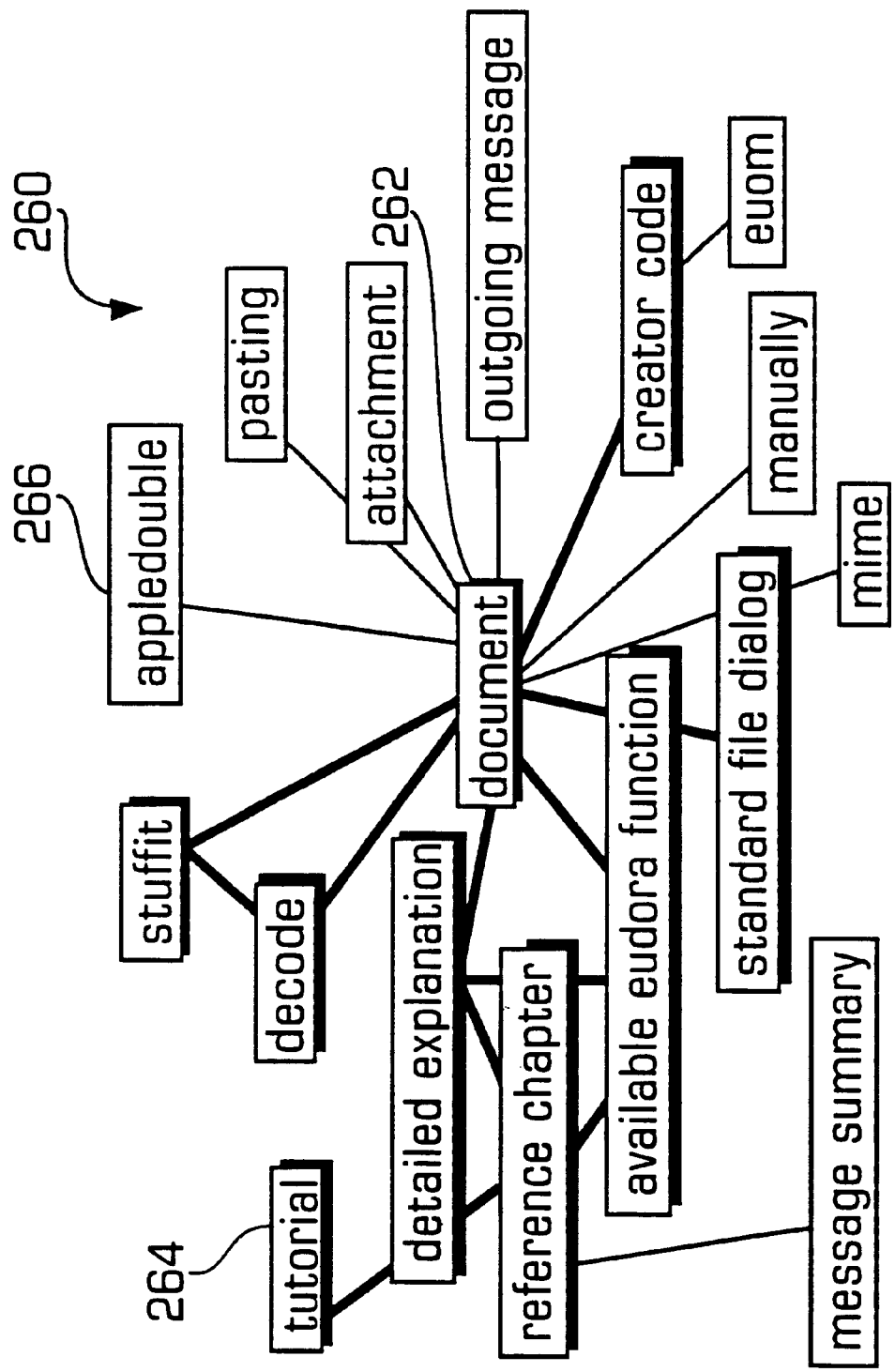
FIG. 15 is a diagram of an example of a meta-map for a sample piece of textual data.
Figure 16:
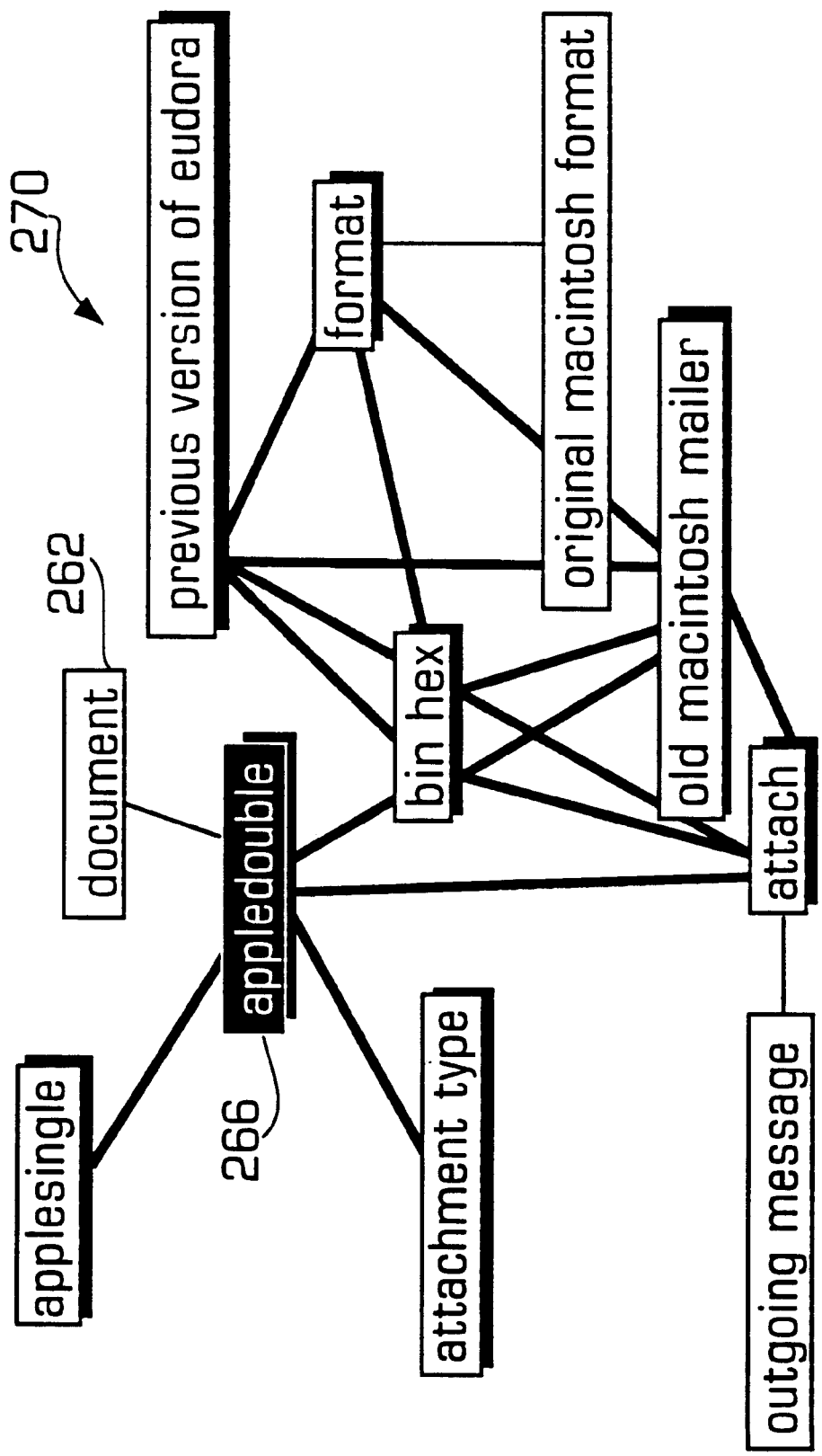
FIG. 16 is a diagram of an example of a sub-map for the sample piece of textual data of FIG. 15.
Figure 17:
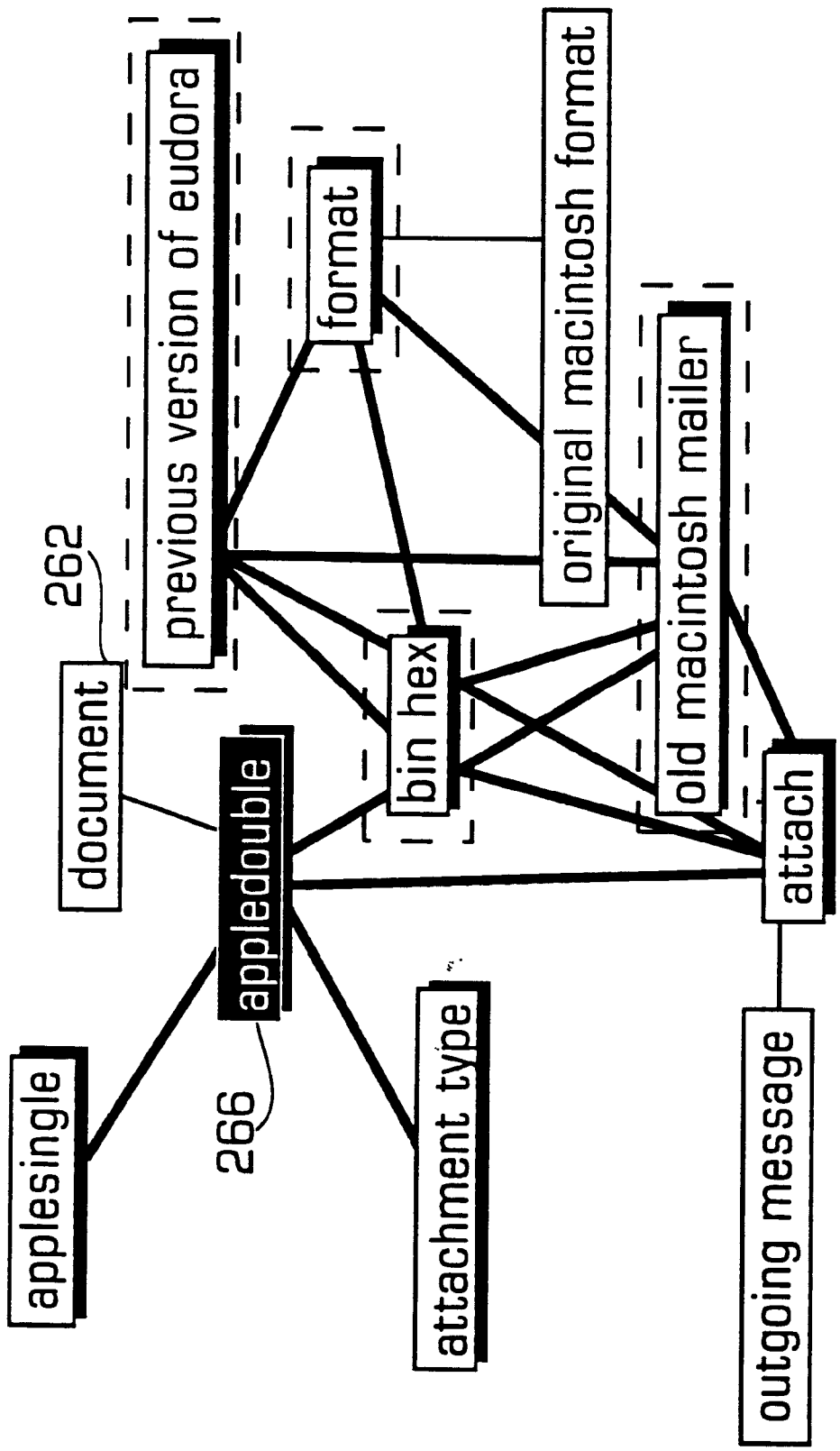
FIG. 17 is a diagram showing a user selecting various clusters from the sub-map shown in FIG. 16.

The mapping sub-system 24 may gather text 27 from a plurality of locations. An extractor 28 may process the text in order to generate a lexicon 29. The lexicon may be a list of words or phrases that have been selected for their ability to provide context to a sentence. The lexicon will be described below with reference to FIG. 9. The text 27 may then be compared to the lexicon 29 in an information clustering process 30 in which an index may be generated for each piece of text. The index may contain words or phrases that are present in the lexicon and the text. A plurality of maps 31–33 may be generated from these indexes that graphically represent the association of words or phrases to each other as shown in FIGS. 15–17 and described below. These maps may be generated at a first time $t_0$, a second time, $t_1$ and a third time, $t_2$, for example. The maps may change at the different times because additional pieces of text have been added. This mapping sub-system may provide a user with the ability to retrieve text quickly form a large initial number of pieces of text, as described below. The mapping sub-system may also be used in conjunction with the scanning sub-system to provide a user with enhanced searching abilities.

The scanning sub-system 26 may first use a dictionary generator 34 to generate a dictionary 35 from the lexicon. The dictionary may be the list of words or phrases in the lexicon wherein each word or phrase may have a tag associated with it that classifies the words or phrases as, for example, an actor, a function or a topic, as described below with reference to FIG. 6B. The clusters of words within the maps 31–33 may be semiotically processed 36 using the dictionary 35 to generate a scenario 37. The scenario may be an indication of a change between the maps such as, for example, that a person never previously associated with a company has been located in a story about that company. Thus, the scenarios may track changes and trends in the textual data that may occur over time. Therefore, a company may generate maps about a particular company once a week and then creates scenarios for the maps that may track changes in the company, which may be valuable business information to a competitor, for example.

In operation, a company may desire information about a particular industry, such as agriculture, and be further interested in a company, "X", in the agricultural industry. The user may, using the mapping sub-system, locate the relevant words or phrases about company X and the mapping sub-system may generate a map. The mapping sub-system may automatically generate a new map with the same focus on company X every week to incorporate new pieces of text. The scanning sub-system may then process the maps to generate a scenario that may, for example, indicate that the President of the company is leaving. As described below, each different user may have a different focus or interest and thus a different scenario relevant to each user may be generated. Now, the mapping sub-system will be described in more detail.

Figure 3:
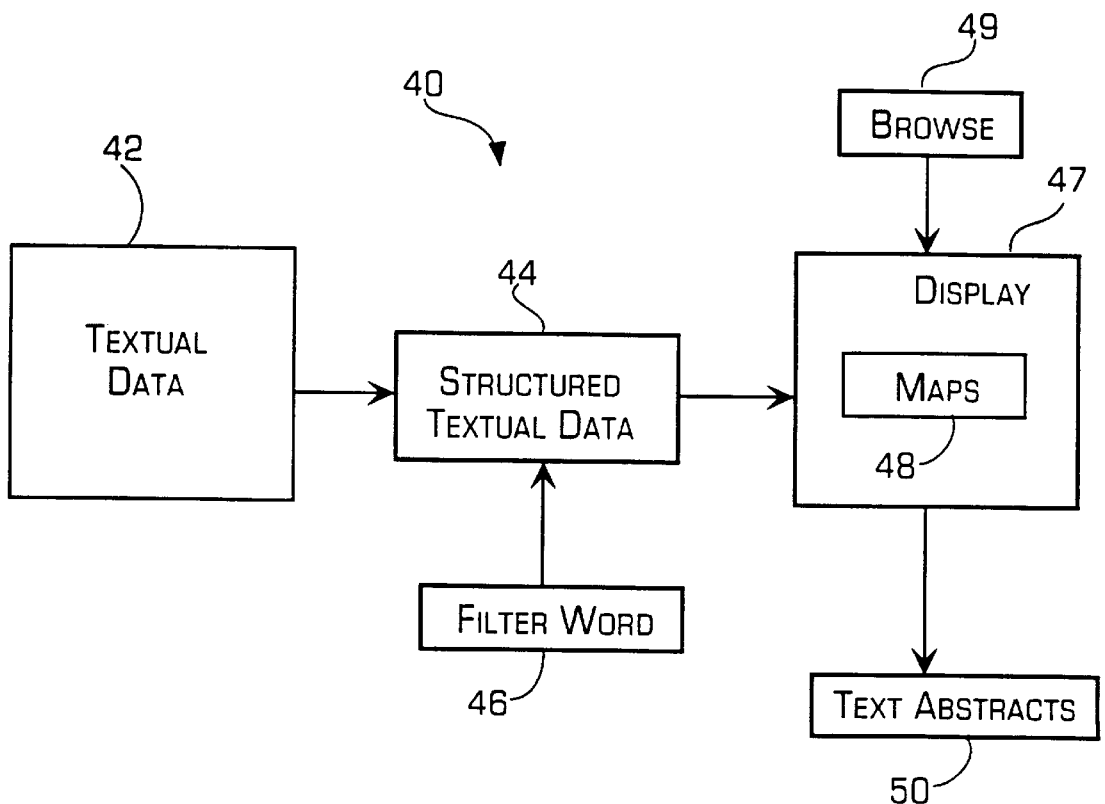
FIG. 3 is a diagrammatic view of a part of the bottom-up context and content-based text processing and retrieval system of FIG. 2.

FIG. 3 is a diagrammatic of a mapping sub-system 40 of a bottom-up context and content-based text processing and retrieval system in accordance with the invention. In the mapping sub-system of the bottom-up text processing and retrieval system, the textual data 42 may be processed, as described in more detail below with reference to FIG. 6A, and analyzed to generate a structured version of textual data 44, that may comprise some of the words and/or phrases in each piece of textual data as described below. The structured version condensed textual data may contain words or phrases that provide the user with knowledge about the content and/or context of each piece of textual data so that a user may easily determine whether a piece of textual data is relevant. As described above, the content of a piece of textual data may be most easily determined from phrases that may be from two words up to about six words, but single words may also convey some of the content of the textual data, such as a proper noun like President Clinton. The details of extracting phrases from the pieces of textual data will be described below with reference to FIG. 9.

To filter out some of the structured text, a user may provide a broad filter word 46 to the system that generally describes the type of information that the user is seeking. The broad filter word may include multiple words separated by Boolean connectors, such as OR, AND and the like. To further limit the scope of the textual data, a user may request textual data limited based upon the date, origin or location of the textual data. For example, a user may request only textual data that is newer than 1995 or only textual data from web pages. The structured text may then be filtered based on the user's filter word and the filtered structured data may be displayed graphically on a display 47 as associations of clusters of words 48, known as maps, as described below, so that a user may browse through the structured version of the textual data using a browse command 49. During the browsing, the user may select various different clusters of words, as described below, and view the textual data associated with those clusters of words. Once the user has completed browsing the clusters of words and has located the appropriate one or more clusters of words that characterize the desired textual data, the user may select those clusters of words and the system may display abstracts 50 of all of the piece of text that contain the appropriate clusters of words. The abstracts may be easily reviewed by the user to determine the relevance of any particular piece of text. If the correct data has not been located, the user may also restart the search from any point and continue to view abstracts until the relevant information is located.

In this mapping sub-system of the bottom-up system in accordance with the invention, the user views only the clusters of words that have been extracted from the text because these words provide the user with knowledge about the content and/or context of each piece of textual data. As described below, words within each piece of textual data that do not contribute to an understanding of the content and/or context of the textual data, known as empty words, may be removed. Thus, the user views only the most relevant clusters of words and may select the appropriate clusters of words without having to make any educated keyword guesses. The details of the text processing and retrieval system with a bottom-up approach in accordance with the invention will be described below in more detail. Now, an example of a client-server networked computer system, that may contain a system for text processing and retrieval in accordance with the invention, will be described.

Figure 4:
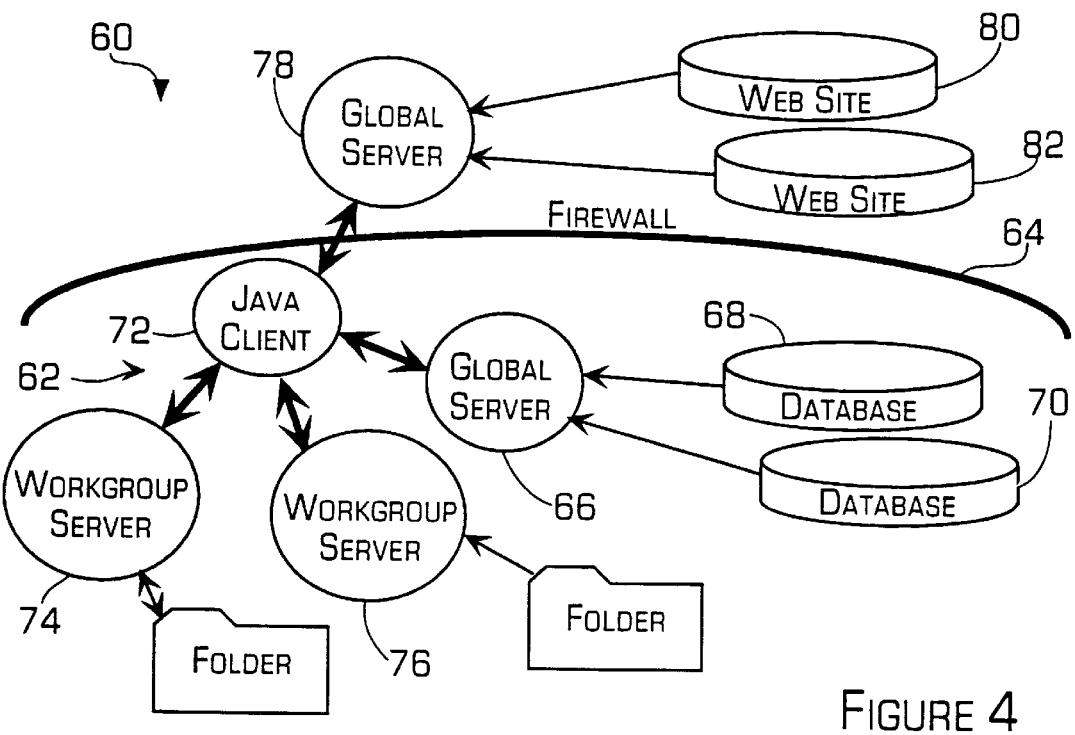
FIG. 4 illustrates a computer client-server system that may use a text processing and retrieval system in accordance with the invention.

FIG. 4 is a schematic view of a client-server based computer system 60 that may contain a text processing and retrieval system in accordance with the invention. As shown, the text processing and retrieval system in accordance with the invention may operate entirely within a corporate or private network 62, but may also access textual data from outside of the corporate network. The computer that stores the software and/or hardware that processes and retrieves text in accordance with the invention may be located within the corporate network, but may also be located on a public wide area network, such as the Internet. The corporate network 62 may be known as an intranet and may be located entirely within a firewall 64 that protects the corporate network from unauthorized outside access. The text processing and retrieval system may retrieve text from outside the intranet through the firewall in a secure manner. Generally, a client-server system may comprise a server computer that stores the database, and one or more remote computer systems that are executing a piece of client software that may interact with the server computer. A client-server computer system is well known and will not be described here.

For the intranet client-server system, a global server 66 located within the firewall 64 may contain software that processes the text to generate maps, as described below, and permits the user to graphically browse the processed text and retrieve any relevant textual data. The software may also semiotically process the maps to generate scenarios that indicate changes in the maps. The text that is processed by the global server may be extracted from within one or more databases, such as a first database 68 and a second database 70. To browse and retrieve textual data from the global server and generate scenarios, a computer attached to the private or corporate network may have a piece of client software 72, such as a JAVA based software application, that interacts with the global server and permits the user to graphically browse the clusters of words and retrieve relevant pieces of textual data as shown in FIGS. 15–18 and also generate scenarios.

A first and second workgroup server 74, 76 may also be accessed by the client software 72 that permits the user to browse clusters of words located in pieces of text located in folders on the workgroup server. In addition to connecting to the secure global server 66 located within the firewall, the client software may also connect to a second global server 78 located outside of the secure firewall on, for example, the Internet. The second global server may gather a plurality of web pages from one or more web sites 80, 82 and process the textual data within the web pages into clusters of words in accordance with the invention. This permits the user with the client software to graphically browse the clusters of words associated with the web pages and retrieve relevant web pages. The text processing and retrieval system may be used to process e-mail messages, text databases, web pages, and any other types of textual data. Thus, the system may process a variety of different types of textual data.

Each of different types of textual data, such as web pages, e-mail, news, and corporate information, have different characteristics. Each web page is a discrete piece of text, there is a huge amount of text, the topics addressed by the web pages may have a wide scope, and there is no certainty about the information gathered from the web. E-mail, on the other hand, are not discrete piece of data due to replies and the like, have scattered focus and topics due to individual's idiosyncrasies, but are chronologically organized. News tends to have a moderate number of documents, has a strong focus, and is chronologically organized. Corporate information are typically larger individual documents and have more focus due to quality control within a corporation. Each of these different types of textual data has characteristics that make it unique, but all of these different types of textual data may be processed and searched using a bottom-up approach in which clusters are built from each set of texts and the graphical representations of the clusters, known as maps, may be used as an interface to guide a user through the textual data. Scenarios, indicating changes over time in the maps, may also be generated from any type of textual data.

The text processing and retrieval system in accordance with the invention may also be located entirely within a stand-alone computer system. For example, a company may have a large database of textual data from which, for example, the accounting department wants to retrieve textual data. The system, in accordance with the invention, may also be operated on different computer systems. Typically, the system may be operated on larger computer systems because the text processing and retrieval in accordance with the invention is fast and may easily handle a large amount of textual data. Now, an architecture of a system for processing and retrieving textual data in accordance with the invention will be described.

Figure 5:
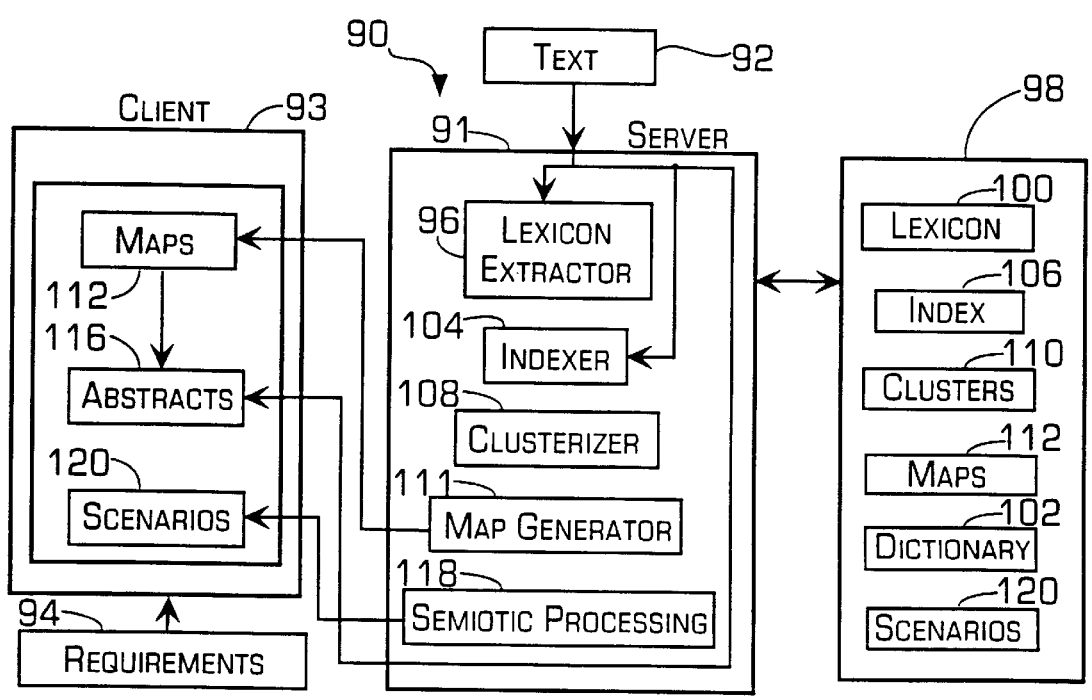
FIG. 5 is a diagrammatic view of a text processing and retrieval system in accordance with the invention.

FIG. 5 illustrates an architecture of a text processing and retrieval system 90 in accordance with the invention. A server 91 may process, using software running on the server, a plurality of pieces of textual data 92, while a piece of client software 93, which permits a user to interact with the server, may permit a user to graphically browse through the textual data based on one or more user selections (requirements) 94. The elements shown within the server and the client software are functional block diagrams and the functions, such as an indexer, may be software running on the server that controls the processor within the server. The functions may also be implemented by a hardware circuit within the server that performs the functions.

Prior to describing the details of the functional units within the system, a description of the overall operation of the system will be described. Initially, a plurality of pieces of textual data may be gathered from disparate locations, such as the Internet. Next, these pieces of textual data are processed, as described below, to generate a list of phrases and word (the lexicon) that conveys the content of the pieces of textual data. Usually, these phrases and words are nouns because nouns generally provide the most information about the content of a piece of textual data. The processing of the textual data may occur prior to a user attempting to retrieve data from the system. Each piece of textual data may then be compared to this lexicon to generate an index for each piece of textual data that contains the words or phrases that convey the context or content of each piece of textual data. A user may then provide a filter word to the system which in turn eliminates indexes that do not contain the filter word. Next, the remaining indexes are grouped together as clusters, as described below, so that phrases with a certain degree of relationship are grouped together. These clusters and the degree of relationship of these clusters may be displayed graphically as maps for a user of the system and the maps may have a hierarchical structure so that clusters with different degrees of relationship are located on different maps. These maps may be displayed for the user who may review the maps and move through the hierarchical structure of the maps to locate the relevant clusters. Once one or more displayed clusters are chosen by the user, the system may display an abstract of each piece of textual data that contains the selected clusters. The system reduces the textual data into the indexes, generates a plurality of maps having a hierarchical structure, and graphically displays the information for the user to review so that the user may retrieve textual data from a huge amount of textual data, but may still view the actual textual data. The system may also automatically generate a map at different times and compare the maps to each other using a dictionary to locate and display changes in the relationships shown in the maps, known as scenarios. Now, the details of the system will be described.

Within the server 91, the text 92 may enter an extractor 96 that processes the text, as described below, and generates a lexicon 100 based on the textual data. The lexicon may be stored in a database management system (DBMS) 98. A lexicon may be a list of one or more clusters of words that have been extracted from the text, as will be described below with reference to FIG. 9. A dictionary 102 is a more complex data structure that starts with a lexicon and adds tags to the clusters of words which classify each cluster of words by content-based concepts, such as actors, functions and topics, for example. The dictionary, used to semiotically process the maps, will be described below with reference to FIG. 10. Neither the lexicon or the dictionary contain words or phrases that do not contribute to an understanding of the content or context of the textual data, as described below.

The lexicon may be a list of phrases that convey the content of the textual data. As an example, a web page may display a tattoo that has the following caption, "From left to right: My most recent addition, the purple roses—February 1995—'Big John', Ink and Iron. Yellow rose and heart. 'Snake' Southwest Tattoo" and may have phrases extracted from it, in accordance with the invention that provide sufficient context to determine the content of the textual data. The phrases extracted may be "recent addition", "purple roses", "Big John", "Yellow Rose" and "Southwest Tattoo". These phrases provide a reader with sufficient information about the textual data to determine the content of the web page.

In generating the lexicon, two-word phrases, known as bigrams, are important. Bigrams are important because they can solve the inherent problem with language, as described above, that a single word may have several meanings depending on the context that the word is used in. The example cited above was that "bank" may be a "savings bank" or a "river bank" and it is not possible to determine which based only on the word "bank". As another example the word "Internet" has a fuzzy scope and may have several different contexts, whereas the bigram "Internet protocol" permits the context to be determined quickly. As another example, the word "plot" may mean a real estate lot or a characteristic of a story. However, the bigrams "garden plot" and "seamless plot" make clear the meaning of the word "plot". There are some single words that may also convey content, such as "Clinton". The lexicon will be described below in more detail.

Figure 6A:
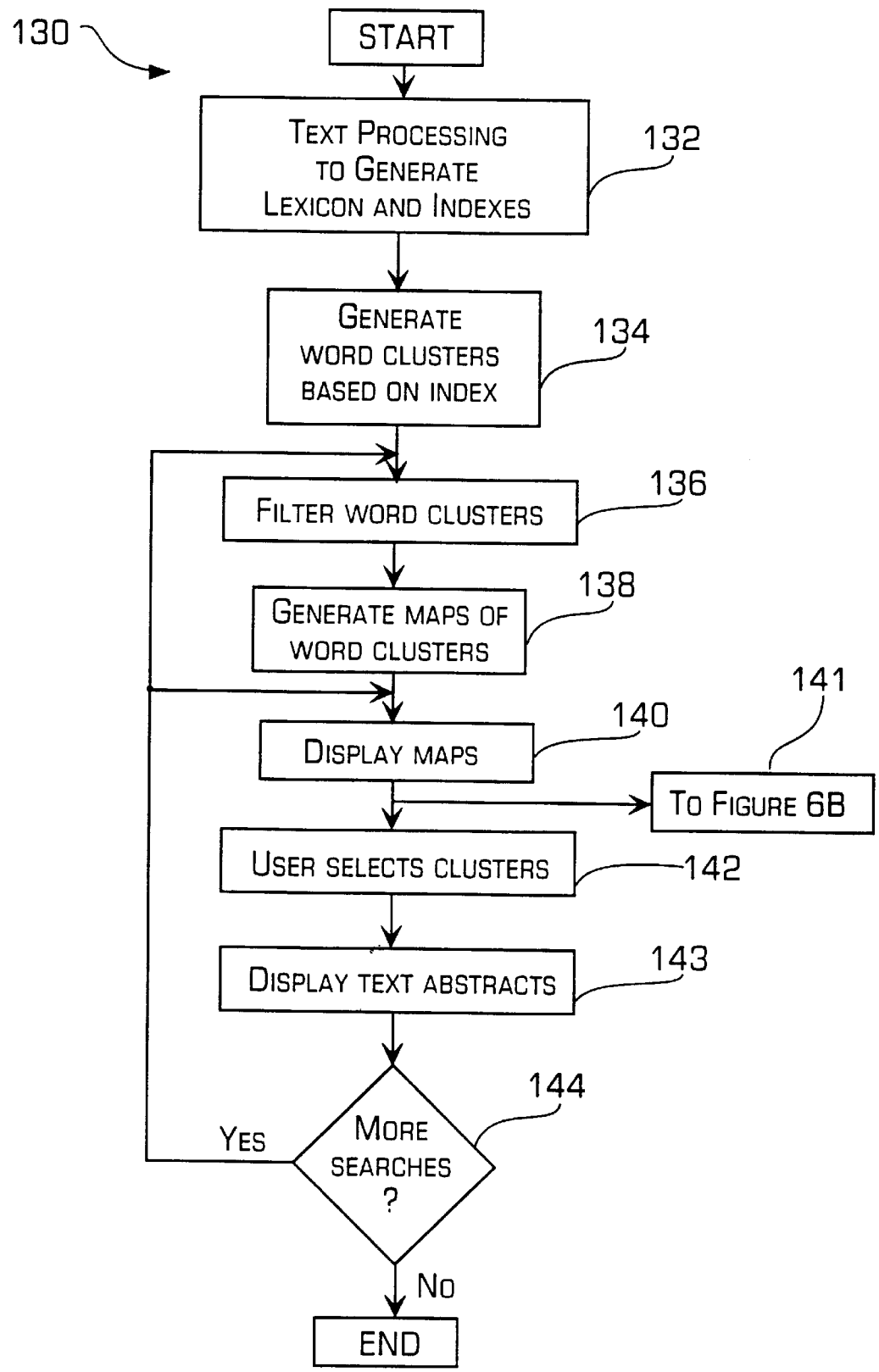
FIG. 6A is a flowchart of an overall method for processing and retrieving textual data in accordance with the invention.
Figure 6B:
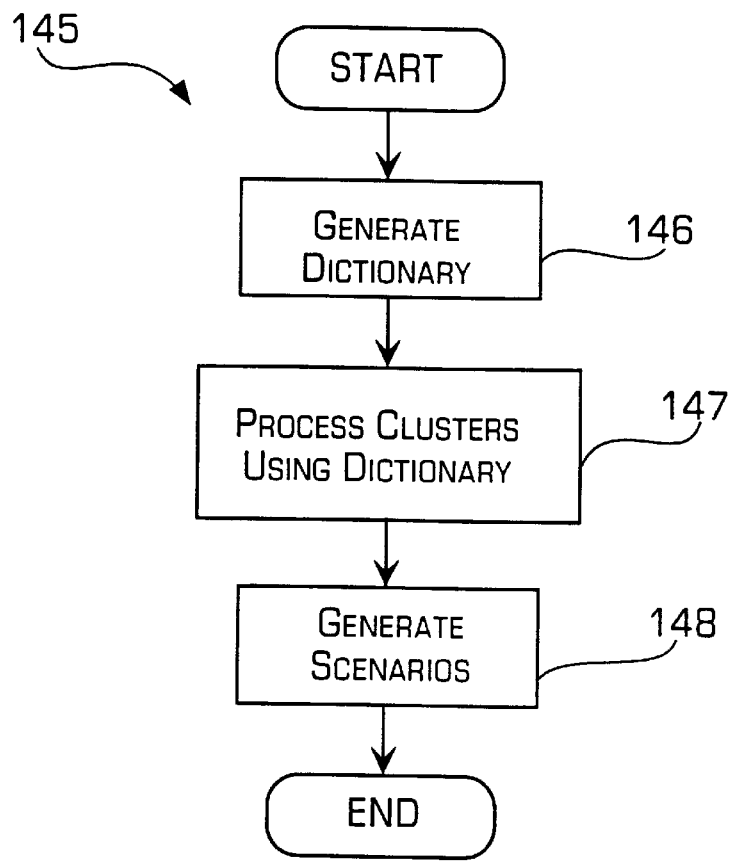
FIG. 6B is a flowchart of a method for generating scenarios in accordance with the invention.
Figure 7:
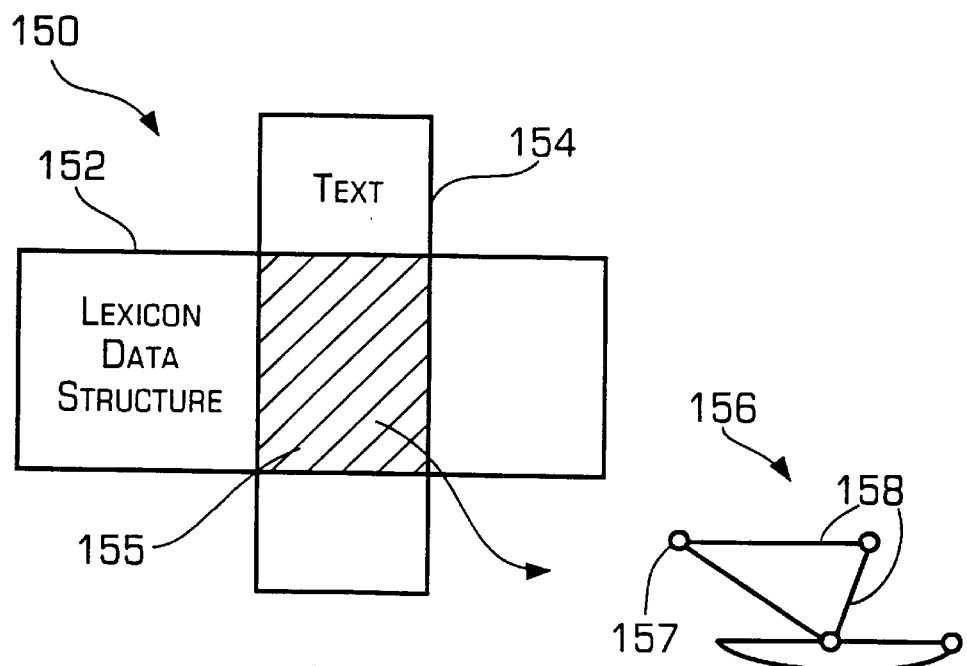
FIG. 7 illustrates a map being generated from the comparison of a piece of text and a semiotic data structure in accordance with the invention.

Returning to FIG. 5, an indexer unit 104 compares the textual data 92, that may be different or the same as the textual data used to generate the lexicon, to the lexicon 100, as shown in FIG. 7 and described below in more detail, and generates an index 106 for each piece of textual data. The index may be stored in the DBMS 98 and may be a list of phrases in each piece of textual data that are also contained in the lexicon. The index may be fed into a clusterizer unit 108, that may group phrases within the indexes that have some degree of relationship with each other, as described below, and may generate clusters 110 that may also be stored in the DBMS. A graphical representation of the clusters, as described below and shown in FIGS. 15–17, may be generated by a map generator unit 111. The graphical representations of the clusters 112, known as maps, may be stored in the DBMS and may be downloaded to the client software 93 so that the maps are displayed by the client software. There may be a plurality of maps organized in a hierarchical structure so that clusters with different degrees of relationship are located on different maps. The user may then view the maps and navigate through the hierarchical structure, based on the user's selections (requirements) 94 as described above, and may select one or more clusters that appear to be relevant. Each cluster may correspond to one or more pieces of text. The server 91 may then generate abstracts that contain the portions of these pieces of text that contain the selected clusters and these abstracts 116 are displayed on the client computer 93. The maps 112 may be semiotically processed 118 using the dictionary 102 to generate a scenario 120. The scenario may be displayed on the client computer 93 and may indicate changes in the relationship shown in the maps over a period of time. Now, an overall method for processing and retrieving textual data will be described with reference to FIGS. 6A and 6B.

FIG. 6A is a flowchart presenting a mapping method 130 for processing and retrieving textual data using the system of FIG. 4, in accordance with the invention. First, a plurality of pieces of textual data may be gathered from disparate locations, stored in the database and may then be processed 132 to generate a lexicon, as described above. The processing may remove words, known as "empty" words, from the pieces of textual data that do not contribute any content to the textual data. For example, articles, such as "a" and "the", prepositions, and verbs, among other words, may be removed because these empty words do not provide any content to the textual data. For example, the content words of the phrase, "President Clinton went running this morning with Senator Bob Dole.", are "President Clinton", "running", "morning" and "Senator Bob Dole". The processing of the text will be described in more detail with reference to FIG. 8. During the text processing, each piece of textual data may be compared to the lexicon and an index for each piece of textual data is generated. Thus, output of the processing is an index for each piece of textual data that contains a list of the phrases that appear in the piece of textual data and in the lexicon. The index is a version of a piece of textual data that contains only words or phrases that provide some understanding of the content of the piece of textual data. In step 134, the indexes may be clustered wherein phrases that appear more often together than separately are associated with each other, as described below. Thus, each piece of textual data has one or more phrase clusters associated with it.

The processing may preferably occur at a time before any user attempts to retrieve any textual data from the system so that a user's search is not delayed by the processing steps, but may also occur during retrieval. The rest of the steps may occur in real time as the user is trying to retrieve textual data. The clusters generated may be stored in the server and may be filtered in step 136 to generated filtered indexes based on a broad filter word input by a user that generally describes the type of information in which the user is interested. This broad filter word is not a keyword query, but is a context-based filter applied to the indexes in order to reduce the amount of data that the user must browse through. The broad filter word may also limit the amount of textual data by limiting the textual data based on date, origin, for example. Thus, the textual data may be filtered based upon several different criteria. For example, if the user is looking for articles on aircraft company executives, the broad filter word may be "aircraft" or "airplane". In step 138, the server uses the filtered indexes or clusters of words or phrases, as described below, and connects the clusters together into one or more graphical maps as shown in FIGS. 15–17. These text processing steps permit the user of the system to view the actual words and cluster of words within the textual data and browse through the clusters of words to locate the desired information. These text processing steps are part of the bottom-up approach of the system in accordance with the invention. A overview of the method for retrieving textual data in accordance with the invention will now be described.

The following steps describe how a user retrieves textual data and generate scenarios in accordance with the invention. These retrieval steps permit a user to rapidly search through the graphically displayed clusters and locate the relevant pieces of textual data. First, in step 140, the previously generated maps are displayed by the client software for the user to view. The maps, as described below and shown in FIGS. 15–17, may also have links to other maps that may have more detailed clusters. The maps may be semiotically processed 141 to generate scenarios as described below with reference to FIG. 6B. The user may select one or more clusters from the maps in step 142, and the system will display, in step 143, the abstracts of the pieces of text within the database that contain the one or more clusters selected by the user. In step 144, the user may elect to perform another search. In accordance with the invention, the additional search may be started from any point so that the method may return to either step 136 or 140 depending on where the user wants to start the additional search. If no additional searches are required, then the method ends. The details of the text processing steps that are a part of the overall method shown in FIG. 6A will now be described with reference to FIGS. 7 and 8.

FIG. 6B is a flowchart of a scanning method 145 that is part of the overall method and may be combined with the mapping method. In step 146, a dictionary may be generated based on the lexicon. The details of the dictionary are described with respect to FIG. 10 in which words and phrases in the lexicon have tags associated with them indicating whether the word or phrase is, for example, an actor, a function, or a topic. Next, in step 147, the clusters on the one or more maps may be processed using the dictionary to generate a scenario in step 148. The maps may be generated at different times (e.g. once per week) and the processing detects changes in the relationships of the clusters on the maps, known as the scenario. For example, a plurality of maps focused on a company X may be processed to generate a scenario which indicates that a key employee has left company X with some technology. This type of scenario data may be valuable to another company that competes with company X or is considering acquiring company X.

The semiotic processing using the dictionary reduces the information in the maps to a easy to review format of three principle types of information: 1) who is in the text (person); 2) what is the person doing (function); and 3) what is the context (topic). Thus, by scanning the maps, it may be determined that, for example, a company in a usual industry has now entered a new industry.

The semiotic processing using the dictionary focuses on building stories (who, what, context) based on the maps so that a user may easily review a piece of text. For example, a long article about a person in connecting with two separate companies may be reduced to the person and his relationships to both companies. The semiotic processing may also detect changing relationships. Now, a method for generating a map will be described.

FIG. 7 illustrates diagrammatically a method 150 for forming a map in accordance with the invention. A lexicon 152 and a piece of text 154 are compared to each other. An intersection 155 of the phrases in the textual data and in the semiotic data structure may be stored as an index. The indexes for a plurality of the textual data may then be clustered, as described below, and converted into a map 156. The map may have a plurality of nodes 157, representing phrases contained in the indexes, and a plurality of links 158 linking together the nodes that are clustered together.

Figure 8:
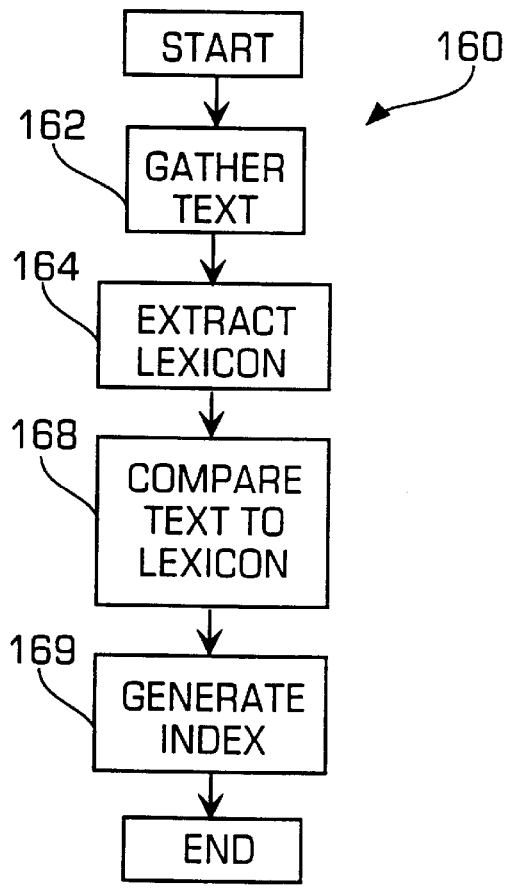
FIG. 8 is a flowchart of a method for processing textual data in accordance with the invention which is a part of the overall method shown in FIG. 6A.

FIG. 8 is a flowchart illustrating a method 160 for text processing in accordance with the invention that is a part of the overall method shown in FIG. 6A. These text processing steps may be performed at any time, but preferably are performed whenever textual data within the server is updated or added so that the text processing does not occur while the user attempts to retrieve textual data. In a first step 162, a plurality of pieces of text, that may be documents, web pages, e-mail messages or news postings, or a combination of all of them, are gathered together and stored within the system. In the Internet context, these pieces of text may be gathered by a text gathering software application running on the server, known as a robot, and may be from a plurality of disparate locations on a wide area network, such as the Internet. For the intranet system, the pieces of text may already be located in a database or in a computer that stores all of the e-mail messages for the company. Once the pieces of text have been gathered, in step 164, a lexicon may be extracted from the gathered pieces of text. The lexicon will be described with reference to FIG. 9. The text processing filters all of the pieces of textual data, removes empty words that do not contribute to the context of the pieces of text, such as stop words like "a", "the", "at", and retains only phrases that tend to convey the context of the particular piece of text. Generally, these phrases contain two up to six words. Thus, the output is a lexicon that may be a list of phrases that are considered to be valuable for purposes of reducing each piece of text down to the essential clusters of words that convey that content of the piece of text. The generation of the lexicon may occur continuously even while indexes are being generated, so that as addition pieces of text are gathered and analyzed words may be added to the lexicon and then indexed.

As the lexicon is being generated or after the lexicon has been generated, each piece of text may be compared to the lexicon in step 168 to generate an index in step 169. The index may contain a list of phrases (two or more words) or words that appear in both the piece of textual data and the lexicon. Thus, the index for each piece of textual data contain the list of words or phrases that convey the content and/or the context of each piece of textual data. This index may be thought of as a reduced version of each piece of text, because all empty words are removed and only the remaining context words within each piece of text are stored. The empty words may be contained in a stop list, as described below, along with punctuation marks. These empty words do not add context to the text and may be removed by comparing each piece of textual data to the stop list and removing the stop list words. Once each piece of text has been indexed, some of the indexes may be used, as described above, to generate clusters and maps of these clusters so that a user may locate and retrieve relevant pieces of text from a large amount of textual data without having to resort to a keyword search. Now, a method for generating a lexicon, in accordance with the invention, will be described.

Figure 9:
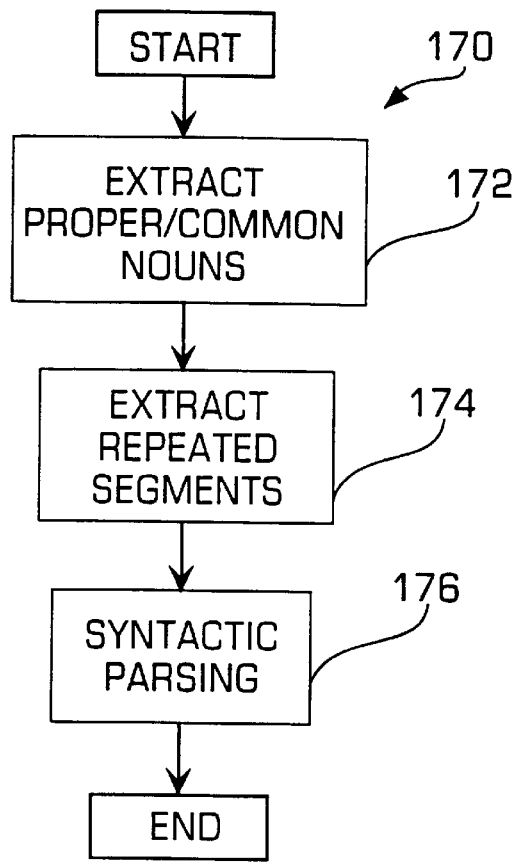
FIG. 9 is a flowchart of a method for generating a lexicon in accordance with the invention.

FIG. 9 is a flowchart of a method 170 for generating a lexicon, in accordance with the invention. As described above, the lexicon may be a list of phrases, each phrase preferably consisting of two to six words, that provide the greatest amount of context to a piece of text. The lexicon may also consist of individual words. Once the pieces of text have been gathered, a series of three processing steps may be performed to extract certain predefined items from the textual data. These processing steps may include, for example, proper nouns and common noun extraction, repeated segments extraction and syntactic parsing as shown in steps 172, 174, and 176. Each of these processing steps, which will be described below, may occur on a single pass through the pieces of text, each by a different piece of software running on the server that extracts certain words or clusters of words from the textual data, but each step will be described separately. To understand these text processing steps, it is necessary to understand that the system, in accordance with the invention, may have a list of stop-words stored within the system. The stop-list was described above with reference to FIG. 6A. Prior to any of the text processing steps described below, all words contained within the stop-list may be removed from each piece of textual data.

In the proper noun and common noun extraction step 172, proper nouns and common nouns are identified and extracted from each piece of text. To extract the proper nouns, the text is analyzed and words with capitalized first letters are extracted, such as "Bill Clinton". The extracted words are assumed to be proper nouns, and may be filtered based on simple empirical rules to avoid slogan-like sequences. To extract the common nouns, the text is analyzed, all stop-list words, all punctuation, and all infinitive verbs are ignored. Any remaining phrases with at least two words, which are known as bigrams, are assumed to be common nouns and are placed into the lexicon. As an example, a short paragraph will be shown, and the common noun phrases extracted from it according to the invention. The paragraph may be:

"As mentioned in the topic summary, Designer does not allow for placement of dimensions against features which might be considered as theoretical representations. Examples include profile, or silhouette, outlines of cylinders and other curved parts, where the representative geometry is directly dependent on current viewpoint."

If we substitute a slash for all words belonging to the stoplist, a dash for all breaks (such as spaces and punctuation), and a skip (">") for to all infinitive verbs, three bigrams may be extracted as set forth below. The paragraph, after processing, looks like:

—/mentioned//topic summary-Designer//>/placement/>/ >/ //considered/theoretical representations— Examples>>- />->/ cylinders//curved>—// representative geometry//dependent/ current viewpoint—

As can be seen, the paragraph has been significantly reduced and the following common noun bigrams may be extracted, "topic summary", "theoretical representations", "representative geometry" and "current view point". In addition, "Designer" may be extracted as a proper noun. Now, the repeated segments extraction will be described.

In the repeated segments extraction step 174, phrases or sequences of two to six words may be located within each piece of text by filtering out the stop-list and any other empty words, as described above. In the repeated segment extraction, segments of words which are repeated are detected to capture their idiomatic value, and may be extracted. Typically, the most frequent repeated group of words are two word phrases, known as bigrams. Any repeated phrases may be included within the lexicon. The best phrases for purposes of generating the lexicon usually contain two or three words. Any of these phrases or sequences that are repeated are stored in the lexicon. An example of a repeated segments extraction will now be described. In a large number of news stories, there were 37,976 repeated segments, but over 25,000 of the repeated segments were bigrams, which included "in the", "of the", and "on the" which may be filtered out because they contain stopwords. The repeated segments may also include, however, the bigrams "operating system", "hard disk", "cd-rom drive", and "home page" among the other bigrams. These bigrams may be stored in the semiotic data structure because they do not contain stopwords and contribute to the understanding of a piece of text.

The syntactic parsing step 176 may be used for the intranet system, as described above, but is usually not convenient for the Internet context because the volume of textual information in the Internet context is too large to permit efficient, timely syntactic parsing. The syntactic parser may analyze each piece of text and categorize each word by its part of speech, such as, for example, a noun, a verb, an adjective, or an adverb. To perform this parsing, the system may have a plurality of templates that may contain a list of the parts of speech or combination of the parts of speech that should be added into the lexicon. For example, a template may indicate that all verb-verb combinations should not be stored within the lexicon. In accordance with the invention, these templates avoid verbal phrases and concentrate on noun phrases. As described above, a verbal phrase in a sentence, such as "might go" in the sentence "Bill Clinton might go to Asia" does not add any context to a sentence. The context words within the sentence are "Bill Clinton" and "Asia" which are noun phrases. These templates and the syntactic parsing helps to further filter out unwanted phrases and words from the pieces of text.

As described above, the generation of the semiotic data structure occurs constantly so that as additional piece of textual data are gathered, the semiotic data structure is updated to include any phrases from these new pieces of textual data. Thus, the semiotic data structure is being constantly built and being improved whenever any new pieces of textual data are located. Thus, as time passes, the semiotic data structure may become more astute at removing unwanted phrases and may, in fact, be trained for a certain user. For example, a aircraft company that has installed the invention may initially generate the semiotic data structure using aircraft articles so that mostly aircraft related phrases are stored in the semiotic data structure. Thus, when other documents are added into the system, mostly aircraft related phrases will be extracted. Now, a method of generating a dictionary in accordance with the invention will be described.

Figure 10:
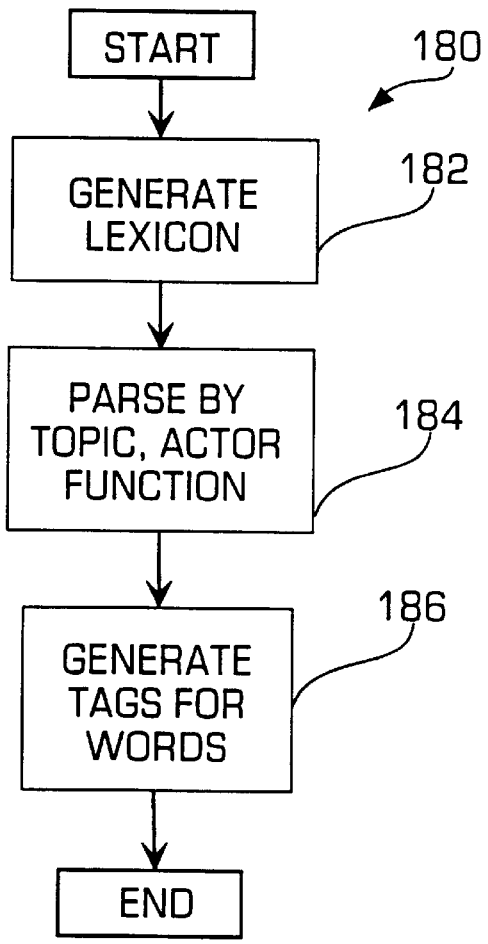
FIG. 10 is a flowchart of a method for generating a dictionary in accordance with the invention.

FIG. 10 is a flowchart showing a method 180 for generating a dictionary in accordance with the invention. The method for generating the dictionary begins at step 182 by generating a lexicon, as described above, because a dictionary is based on a lexicon. The dictionary is a lexicon that is more content-based as described below. The lexicon may be parsed for various content-based categories in step 184 and content-based categories may be generated for each phrase in the lexicon in step 186. To parse the lexicon for content-based categories, each of the phrases or word clusters within the lexicon may be categorized as either, for example, "an actor", "a function", or "a topic". An actor may be a person, a topic may be some type of activity or physical object, and a function is anything that describes the actor or topic in more detail. For example, the phase, "Bill Clinton has signed a deal relating to a joint venture between companies for a new personal computer." may be categorized in the following manner. "Bill Clinton" is an actor, "signed a deal" and "joint venture" may be functions and "personal computer" may be a topic. Topics are more difficult to define because there may be a large number of different classes and subclasses, but a common source of data, such as Roget's Thesaurus, may be used to generate the various topic classes that are going to be used to classify the phrases within the lexicon. The output of the content-based category parser is a dictionary where each phrase or word cluster within the lexicon has been assigned one or more content-based category tags. For example, the phrase "super weather" may have a primary topic tag (i.e., "weather"), and a secondary tag that may be a function (i.e., "super"). Thus, the dictionary may use the lexicon, but then further refines the lexicon by adding the content-based categories of the phrases in the lexicon, such as an actor, a function or a topic. As described above, either the lexicon or the dictionary may be used by the system to process the gathered text. Now, a method for constructing a cluster and map in accordance with the invention will be described.

Figure 11:
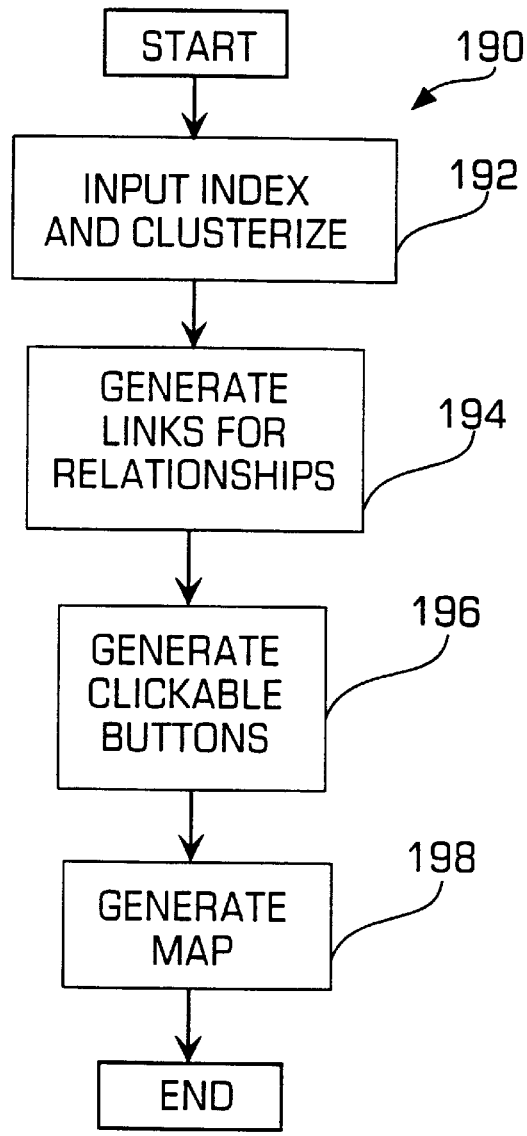
FIG. 11 is a flowchart of a method for generating a cluster and a map in accordance with the invention.

FIG. 11 is a flowchart of a method 190 for generating a cluster and a map of the cluster in accordance with the invention. In step 192, the indexes of all of the pieces of textual data that contain the user's selected broad filter word may be gathered. In steps 194–198, the indexes may be clustered as described below. The input to the clusterizer system is a plurality of indexes, for each piece of text. The phrases that are found frequently related to each other are clustered. The clustering algorithm used may be one of a well known number of clustering algorithms, such as that created by Dr. Bertrand Michelet. The basic principle of Dr. Bertrand Michelet's algorithm is that for two given words, the probability of the words being separate from one another and the probability that the words are found together are both calculated. If the probability of the words being found together is greater than the probability of the words being found apart from each other, then the words are clustered together.

Once the phrases has been clustered together, the clustered phrases for all of the pieces of textual data are converted into a graphical map, examples of which are shown in FIG. 12, and FIGS. 15–17. The map contain graphical representations of the word clusters as well as lines that indicate a relationship of the word clusters to each other. Since the clusters may have different degrees of relationship, there may be a plurality of maps, organized in a hierarchical structure, so that clusters with the same degree of relationship may be usually located on the same map. The map may also have a system for connecting maps together, as described below. In step 194, solid lines, as shown in FIGS. 15–17, are formed between word clusters to indicate a relationship between the word clusters. In step 196, each map may also have a word cluster that may act as a link to other maps. For example, the word cluster may be a clickable button that moves the user to the map that is connected to the link, as shown in FIG. 16. Thus, in accordance with the invention, there may be a hierarchy of maps that depict related, but different clusters of words.

As shown in FIGS. 15–17, based on the above clustering, the relationships of the phrases may be graphically depicted as a map. For the purposes of mapping the clusters, a first highest level map, that may be known as a meta-map, contains the user's filter word and some of the closest phrases. For example, the meta-map may show a total of fifteen phrases linked together to minimize the clutter on the screen. The number of clusters shown on each map may be reduced to increase clarity. The maps permit a user to rapidly and easily visualize the patterns of words and phrases in the pieces of text so that the user may determine which are the most relevant phrases for purposes of his/her search.

Figure 12:
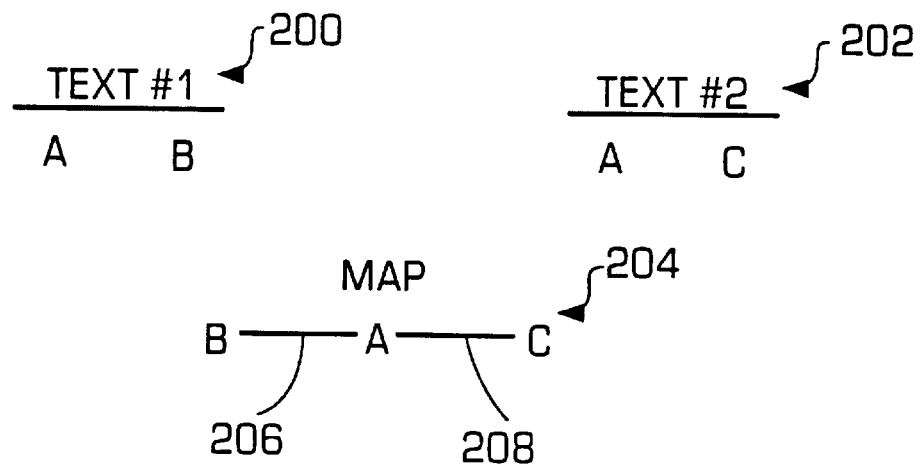
FIG. 12 is a diagrammatic view of an example of a map created from two sample pieces of text.

FIG. 12 shows a simple example of the mapping of words in two different pieces of text onto a single map. A more complex example will be described below with reference to FIGS. 15–18. A first piece of text 200 has phrases A and B within the text while a second piece of text 202 has phrases A and C within the text. For purposes of this example, assume that the lexicon or dictionary contains at least A, B, and C. From these two piece of text, that may be located at disparate locations, a map 204 may be generated. The map may have a first link 206 between A and B and a second link 208 between A and C. These links graphically depict that A and B are related and A and C are related, but that B and C have no relation to each other. Now, a method of retrieving text using a map in accordance with the invention will be described.

Figure 14:
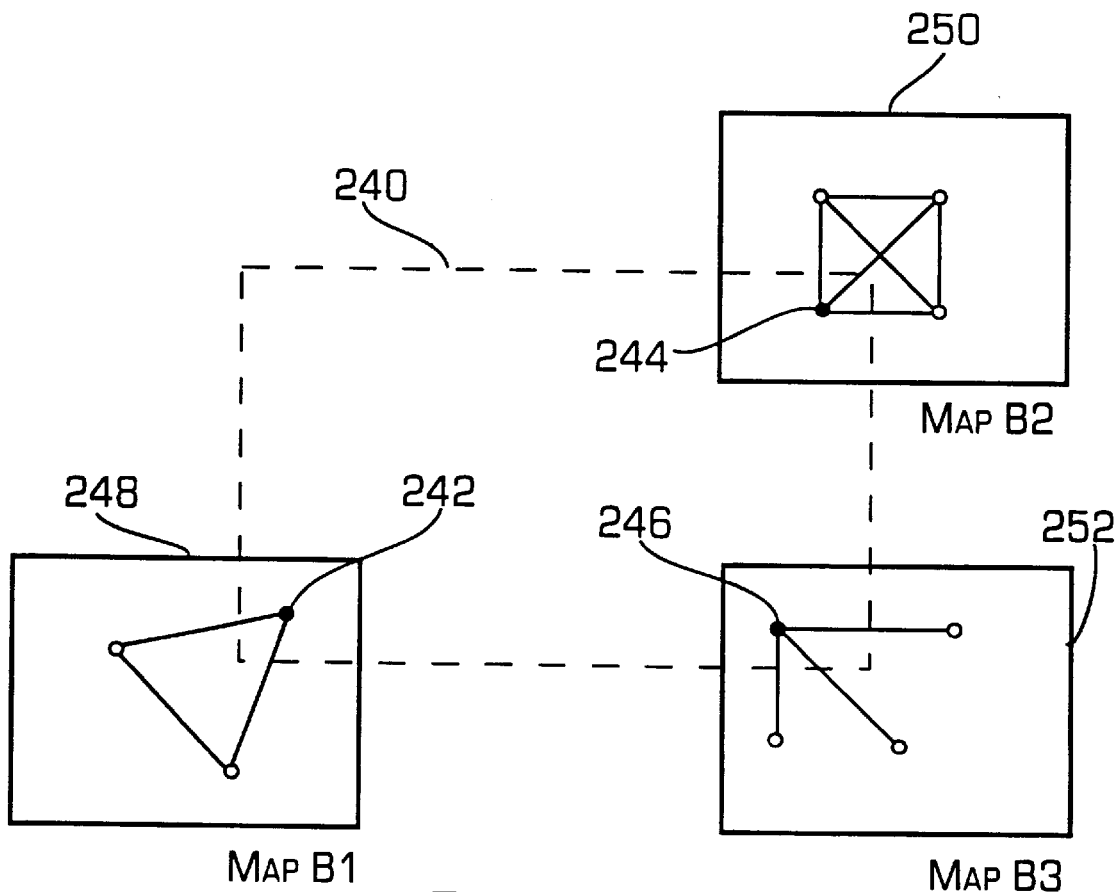
FIG. 14 is a diagram of a meta-map and several sub-maps in accordance with the invention.
Figure 13:
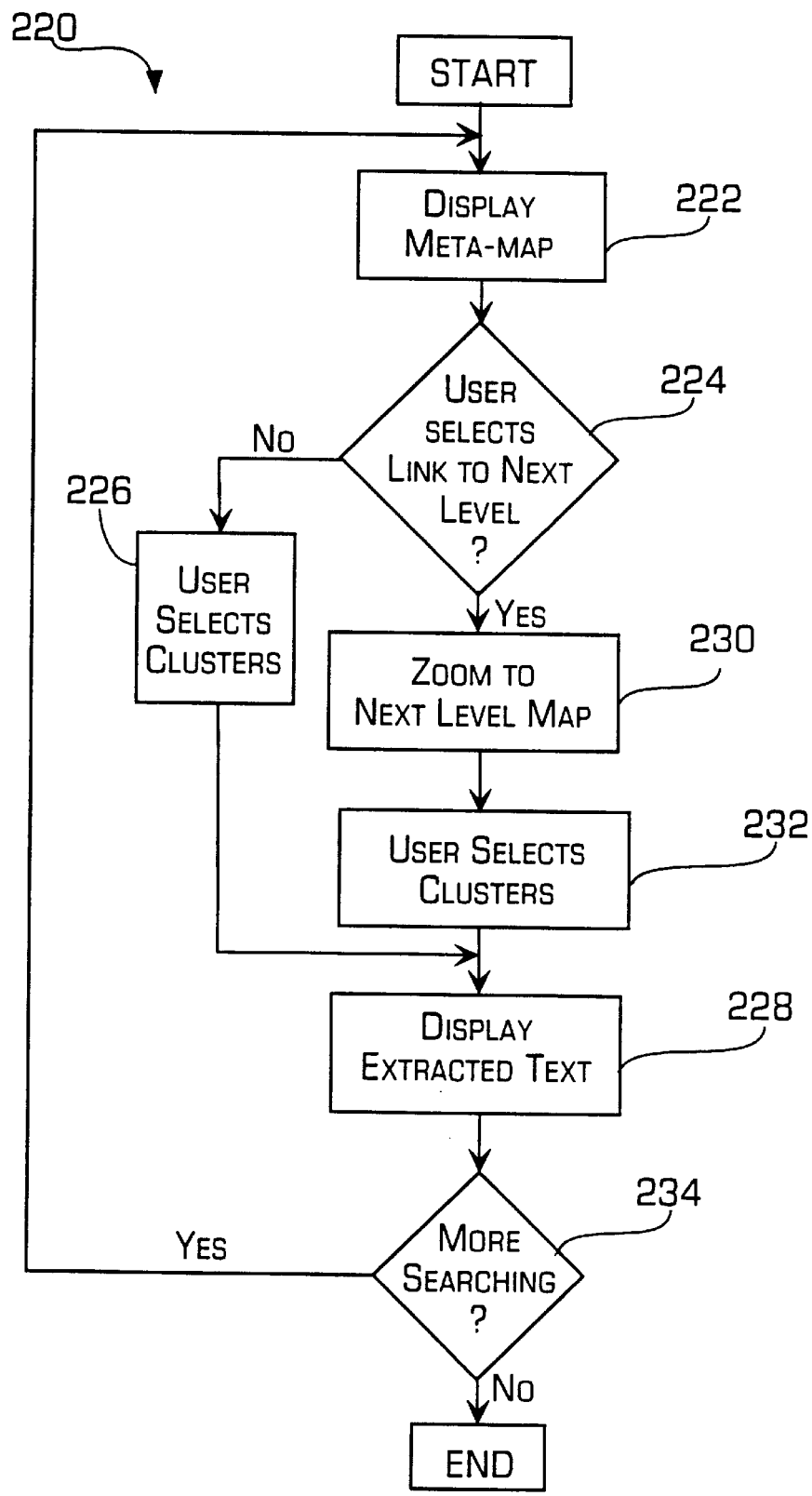
FIG. 13 is a flowchart of a method for retrieving textual data in accordance with the invention which is a part of the overall method shown in FIG. 6A.

FIG. 13 is a flowchart of a method 220 for retrieving text based on a graphical map in accordance with the invention. The method is part of the overall method shown in FIG. 6A. In step 222, a top level map, that may be known as the meta-map, may be displayed for the user. The meta-map may contain the filter word selected by the user of the system and any clusters that are closely related to the filter word. An example of a meta-map is shown in FIG. 14 and will be described below. In step 224, a user may elect to move to a lower level of the map using the clickable buttons described above and as shown in FIG. 16. If not, then in step 226, the user may select any relevant clusters within the meta-map, and in step 228, based on the selected clusters, the system displays extracts of the pieces of text that contain the selected clusters, as shown in FIG. 18.

If the user wants to select a lower level map, then in step 230, the system moves to the lower level map, a process known as zooming. The user may continue to zoom until the appropriate map is displayed. Then, in step 232, the user selects the relevant clusters and in step 228 extracts from the pieces of text containing those clusters are displayed. In step 234, a user may elect to perform additional searches. If more searches are going to be done, then the method loops back to step 222 and begins again. Otherwise the method ends.

The process of zooming in accordance with the invention, may occur at several levels. For example, a broad map may list the entire world wide web, while a lower level map, that may be zoomed to, may contain clusters relating to a particular web site, while a still lower level map may contain clusters relating to an individual web page, and the lowest level map may contain clusters relating to a paragraph within a web page. In another example, a high level map may list clusters that occur a high number of times, while the lowest level map may list clusters that appear once. Thus, a user may choose the level of detail he wants to review and may move rapidly from any level to any other level. Now, an example of a meta-map and several lower level maps will be described.

FIG. 14 is a diagram showing an example of a meta-map 240 that may have a first cluster 242, a second cluster 244 and a third cluster 246 that are related to each other. These clusters are related to each other because these clusters appear near each other in a piece of textual data. Each of these top level clusters may also belongs to a lower level map. For example, the first cluster 242 belongs to a map B1 248 that also contains other clusters that are related to the first cluster, but are not related to the clusters within the meta-map. Similarly, the second cluster 244 belongs to a map B2 250 that also contains other clusters related to it. Similarly, the third cluster 246 also belongs to a map B3 252 that also contains other clusters that are related to the third cluster 246 but are not related to the clusters displayed on the meta-map. As a user moves to lower level maps, more details of the clusters may be shown. The meta-map and lower level maps and the hierarchical structure permit a user to navigate through a larger amount of data because the amount of data displayed on the screen is limited. Now, an example of the operation of the text retrieval system in accordance with the invention will be described.

FIGS. 15–18 illustrate an example of the operation of the text retrieval system in accordance with the invention. In this example, a single piece of textual data was used that was the documentation for a popular e-mail application. The documentation was processed using the system as described above to first generate a semiotic data structure containing a list of words or phrases that convey the content or context of the documentation and then an index of the documentation may be generated by comparing the documentation to the semiotic data structure. The index contains a list of words that are contained in the semiotic data structure as well as the documentation, and because a single piece of textual data was used in this example, the semiotic data structure and the index are identical. The index conveys the content or context of the documentation and may is a structured summary of the documentation. The words or phrases of the index may then be grouped together based on the degree of relationship of the words or phrases, as described above, to generate clusters. A graphical map may be generated from these clusters, wherein the map may include a plurality of nodes each containing a cluster, and a plurality of links that connect nodes that are related to each other. A top-level meta-map 260 shown in FIG. 15 was generated that displays a node 262 containing the user's filter word, such as "document", and a plurality of other nodes 264, 266 that are related to the filter word. The meta-map may also include clusters that are both clusters within the meta-map, as well as links to a lower level map. For example, the cluster 266 may contain the phrase "appledouble". As shown in FIG. 16, when a user clicks on the "appledouble" cluster 266, a lower level map 270, that includes the "appledouble" cluster 266 may be displayed. The lower level map may also include clusters that are related to the phrase "appledouble", but are not related to the clusters shown in the meta-map 260. To move back to the meta-map, the lower level map may also include the "document" node 262. Thus, the clusters are organized in a hierarchical manner so that a limited amount of clusters are shown on the screen at any one time. In this manner, the user can move through all of the maps in a rapid fashion and locate the relevant clusters.

Once the user has located the pertinent map, as shown in FIG. 17, the user may select one or more clusters that appear to contain the relevant phrases. In this example, the user may select the following clusters: 1) bin hex; 2) format; 3) previous version of Eudora; and 4) old Macintosh mailer. The system then uses these selected clusters to retrieve extracts of pieces of textual data that contain the selected clusters. In this example, as shown in FIG. 18, two different extracts are displayed which permits the user to determine whether the documents are relevant without viewing the entire documents. The user may, after viewing the extracts, return to one of the maps within the hierarchy and continue to browse through other clusters.

In summary, the system and method for processing and retrieving textual data in accordance with the invention provides a efficient way to search through a large amount of textual data without using a keyword search. The system first generates a lexicon that may remove any words that do not provide any context to the textual data and retain only words or phrases that may be used by a user to determine the content of a piece of textual data. Phrases and bigrams most often provide the most useful information to determine a content of a piece of textual data. The content-based lexicon may be compared to each piece of textual data to generate an index for each piece of textual data that contains only content-based phrases that provide context to the textual data. The indexes may then be clustered to associate phrases with each other, as described above. Based on these clustered indexes, a map may be generated that graphically depicts the clusters of words and the relationship of the clusters to each other. The maps may also have a hierarchical structure so that a reduced number of clusters are displayed for the user. The maps provide the user with an efficient, quick method for browsing through the pieces of textual data and locating the desired pieces of textual data with minimum effort. A plurality of maps at different times may be processed using a dictionary to generate scenarios which may indicate a change in the relationships shown in the maps. These changes may provide valuable information about, for example, company or industry trends. The system may efficiently process a large amount of data and still permit the user to quickly search through the textual data.

While the foregoing has been with reference to a particular embodiment of the invention, it will be appreciated by those skilled in the art that changes in this embodiment may be made without departing from the principles and spirit of the invention, the scope of which is defined by the appended claims.

I claim:

1. A content-based text processing and retrieval system, comprising:

means for processing a plurality of pieces of text based on content to generate an index for each piece of text, the index comprising a list of phrases that represent the content of the piece of text;

means for grouping phrases together to generate clusters based on a predetermined degree of relationship between the phrases;

means for generating a hierarchical structure, the hierarchical structure comprising a plurality of maps, each map corresponding to a predetermined degree of relationship, the map graphically depicting the clusters at the predetermined degree of relationship and comprising a plurality of nodes, each node representing a cluster, and a plurality of links connecting nodes that are related;

means for selecting a predetermined map;

means for displaying said selected map to a user;

means for selecting a particular cluster displayed on said selected map; and means for extracting a portion of text from said pieces of text based on the selected cluster.

2. The system of claim 1, wherein said processing means comprises means for gathering a plurality of pieces of text, means for extracting a lexicon from said gathered pieces of text, the lexicon comprising a list of phrases that indicate the content of said pieces of text, and means for comparing said lexicon to each piece of text to generate an index for each piece of text.

3. The system of claim 2, wherein said gathering means comprises a software application for gathering pieces of text from the Internet.

4. The system of claim 2, wherein said lexicon extracting means comprises means for removing empty words from said pieces of text, means for extracting proper and common nouns from said pieces of text, means for extracting phrases that are repeated within a piece of text, and means for extracting noun phrases from said pieces of text.

5. The system of claim 4, wherein said means for extracting noun phrases comprises means for comparing a plurality of phrases within said pieces of text to a template in order to extract phrases having nouns.

6. The system of claim 2 further comprising means for generating a semiotic data structure based on said lexicon, said semiotic data structure comprising a tag that is associated with each word in said lexicon to classify which word by its content, and means for comparing a plurality of maps to each other based on the semiotic data structure to generate a scenario, said scenario indicating changes in the relationships graphically depicted by said maps.

7. The system of claim 6, wherein said tag is selected from one of a tag indicating a person, a tag indicating a function and a tag indicating a topic.

8. The system of claim 2 further comprising means for filtering said indexes based on a filter criteria selected by a user to select a predetermined number of pieces of text, and means for generating one or more word clusters from the indexes of said predetermined number of pieces of text.

9. A method for content-based text processing and retrieval, comprising:

processing a plurality of pieces of text based on content to generate an index for each piece of text, the index comprising a list of phrases that represent the content of the piece of text;

grouping phrases together to generate clusters based on a predetermined degree of relationship between the phrases;

generating a hierarchical structure, the hierarchical structure comprising a plurality of maps, each map corresponding to a predetermined degree of relationship, the map graphically depicting the clusters at the predetermined degree of relationship and comprising a plurality of nodes, each node representing a cluster, and a plurality of links connecting nodes that are related;

selecting a predetermined map;

displaying said selected map to a user;

selecting a particular cluster displayed on said selected map; and extracting a portion of text from said pieces of text based on the selected cluster.

10. The method of claim 9, wherein processing comprises gathering a plurality of pieces of text, extracting a lexicon from said gathered pieces of text, the lexicon comprising a list of phrases that indicate the content of said pieces of text, and comparing said lexicon to each piece of text to generate an index for each piece of text.

11. The method of claim 10, wherein gathering comprises using a software application to gather pieces of text from the Internet.

12. The method of claim 10, wherein extracting said lexicon comprises removing empty words from said pieces of text, extracting proper and common nouns from said pieces of text, extracting phrases that are repeated within a piece of text, and extracting noun phrases from said pieces of text.

13. The method of claim 12, wherein extracting said noun phrases comprises comparing a plurality of phrases within said pieces of text to a template in order to extract phrases having nouns.

14. The method of claim 10 further comprising generating a semiotic data structure based on the lexicon, said semiotic data structure comprising a tag that is associated with each word in said semiotic data structure to classify each word by its content, and comparing a plurality of maps to each other, based on the semiotic data structure, to generate a scenario, said scenario indicating changes in the relationships shown by said maps.

15. The method of claim 14, wherein said tag is selected from one of a tag indicating a person, a tag indicating a function and a tag indicating a topic.

16. The method of claim 10 further comprising filtering said indexes based on a filter criteria selected by a user to select a predetermined number of pieces of text, and generating one or more word clusters from the indexes of said predetermined number of pieces of text.

17. A content-based text processing and retrieval system, comprising:

means for processing a plurality of pieces of text based on content to generate an index for each piece of text, the index comprising a list of phrases that represent the content of the piece of text;

means for grouping phrases together to generate clusters based on a predetermined degree of relationship between the phrases; and means for generating a hierarchical structure, the hierarchical structure comprising a plurality of maps, each map corresponding to a predetermined degree of relationship, the map graphically depicting the clusters at the predetermined degree of relationship and comprising a plurality of nodes, each node representing a cluster, and a plurality of links connecting nodes that are related.

18. The system of claim 17, wherein said processing means comprises means for gathering a plurality of pieces of text, means for extracting a lexicon from said gathered pieces of text, the lexicon comprising a list of phrases that indicate the content of said pieces of text, and means for comparing said lexicon to each piece of text to generate an index for each piece of text.

19. The system of claim 18, wherein said gathering means comprises a software application for gathering pieces of text from the Internet.

20. The system of claim 18, wherein said lexicon extracting means comprises means for removing empty words from said pieces of text, means for extracting proper and common nouns from said pieces of text, means for extracting phrases that are repeated within a piece of text, and means for extracting noun phrases from said pieces of text.

21. The system of claim 20, wherein said means for extracting noun phrases comprises means for comparing a plurality of phrases within said pieces of text to a template in order to extract phrases having nouns.

22. The system of claim 18 further comprising means for generating a semiotic data structure based on said lexicon, said semiotic data structure comprising a tag that is associated with each word in said lexicon to classify which word by its content, and means for comparing a plurality of maps to each other, based on said semiotic data structure, to generate a scenario, said scenario indicating changes in the relationships graphically depicted by said maps.

23. The system of claim 22, wherein said tag is selected from one of a tag indicating a person, a tag indicating a function and a tag indicating a topic.

24. The system of claim 18 further comprising means for filtering said indexes based on a filter criteria selected by a user to select a predetermined number of pieces of text, and means for generating one or more word clusters from the indexes of said predetermined number of pieces of text.

25. A method for content-based text processing and retrieval system, comprising:

processing a plurality of pieces of text based on content to generate an index for each piece of text, the index comprising a list of phrases that represent the content of the piece of text;

grouping phrases together to generate clusters based on a predetermined degree of relationship between the phrases; and generating a hierarchical structure, the hierarchical structure comprising a plurality of maps, each map corresponding to a predetermined degree of relationship, the map graphically depicting the clusters at the predetermined degree of relationship and comprising a plurality of nodes, each node representing a cluster, and a plurality of links connecting nodes that are related.

26. The method of claim 25, wherein processing comprises gathering a plurality of pieces of text, extracting a lexicon from said gathered pieces of text, the lexicon comprising a list of phrases that indicate the content of said pieces of text, and comparing said lexicon to each piece of text to generate an index for each piece of text.

27. The method of claim 26, wherein gathering comprises using a software application to gather pieces of text from the Internet.

28. The method of claim 26, wherein extracting said lexicon comprises removing empty words from said pieces of text, extracting proper and common nouns from said pieces of text, extracting phrases that are repeated within a piece of text, and extracting noun phrases from said pieces of text.

29. The method of claim 28, wherein extracting said noun phrases comprises comparing a plurality of phrases within said pieces of text to a template in order to extract phrases having nouns.

30. The method of claim 26 further comprising generating a semiotic data structure based on the lexicon, said semiotic data structure comprises a tag that is associated with each word in said semiotic data structure to classify each word by its content, and comparing a plurality of maps to each other, based on said semiotic data structure, to generate a scenario, said scenario indicating changes in the relationships shown by said maps.

31. The method of claim 30, wherein said tag is selected from one of a tag indicating a person, a tag indicating a function and a tag indicating a topic.

32. The method of claim 26 further comprising filtering said indexes based on a filter criteria selected by a user to select a predetermined number of pieces of text, and generating one or more word clusters from the indexes of said predetermined number of pieces of text.

33. A content-based text processing and retrieval system, comprising:

means for processing a plurality of pieces of text based on content to generate an index for each piece of text, the index comprising a list of phrases that represent the content of the piece of text;

means for grouping phrases together to generate clusters based on a predetermined degree of relationship between the phrases;

means for generating a hierarchical structure, the hierarchical structure comprising a plurality of maps, each map corresponding to a predetermined degree of relationship, the map graphically depicting the clusters at the predetermined degree of relationship and comprising a plurality of nodes, each node representing a cluster, and a plurality of links connecting nodes that are related;

means for generating a semiotic data structure from said plurality of pieces of text, the semiotic data structure comprising a list of phrases that indicate the content of said pieces of text, and a tag that is associated with each phrase in said semiotic data structure to classify which word by its content; and means for comparing a plurality of maps to each other to generate a scenario, said scenario indicating changes in the relationship graphically depicted by said maps.

34. The system of claim 33, wherein said tag is selected from one of a tag indicating a person, a tag indicating a function and a tag indicating a topic.

* * * * *